UNITED STATES PATENT OFFICE.

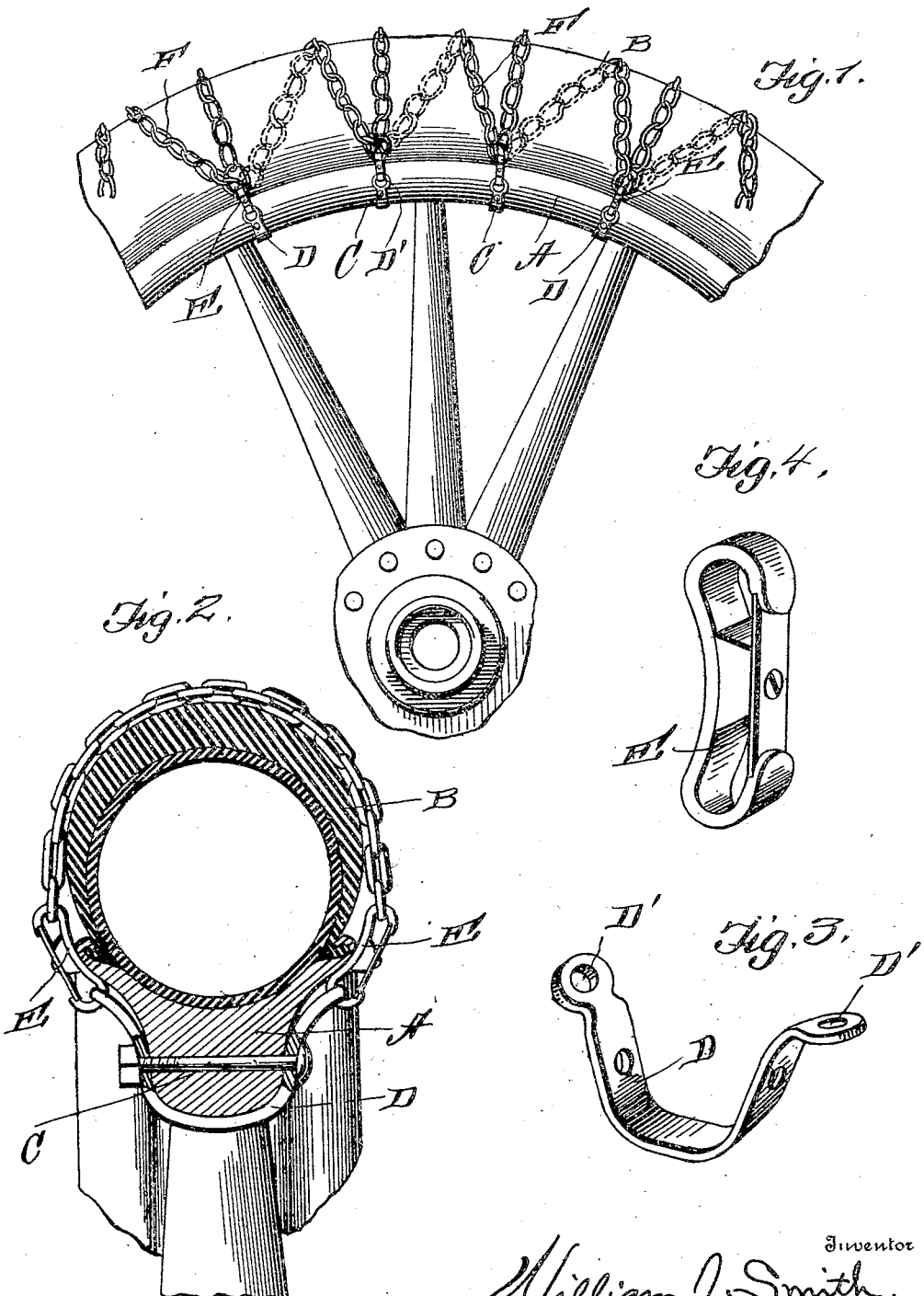

WILLIAM J. SMITH, OF CANASTOTA, NEW YORK.

ANTISLIPPING DEVICE FOR TIRES.

No. 801,115.        Specification of Letters Patent.        Patented Oct. 3, 1905.

Application filed May 15, 1905. Serial No. 260,481.

*To all whom it may concern:*

Be it known that I, WILLIAM J. SMITH, a citizen of the United States, residing at Canastota, in the county of Madison and State of New York, have invented certain new and useful Improvements in Antislipping Devices for Tires; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in antislipping devices for vehicle-tires; and the object of the invention is to produce a simple and efficient device of this character which may be readily applied to or detached from a tire and comprises clips adapted to engage the rim of a wheel and to which clips snap-hooks are connected whereby an ordinary chain may be engaged by the snap-hooks alternately and in a zigzag manner about the circumference of the tire.

The invention consists in various details of construction and in combinations and arrangements of parts which will be hereinafter fully described and then specifically defined in the appended claims.

My invention is illustrated in the accompanying drawings, in which—

Figure 1 is a side elevation showing the application of my invention to a vehicle wheel and tire. Fig. 2 is a cross-sectional view through the tire and rim, showing the manner in which the snap-hooks are held by a clip. Fig. 3 is a detail perspective view of one of the clips, and Fig. 4 is a detail view of one of the snap-hooks.

Reference now being had to the details of the drawings by letter, A designates the rim of a wheel of usual construction, and B a pneumatic tire. Said rim is provided with a series of perforations for the reception of bolts C, which are passed through apertures in the U-shaped clips D. The extreme end of each of said clips is apertured, as at D', the portion of the ends of said clip which extends beyond the bolt C projecting beyond the marginal edge of the rim or felly of the wheel. The curved portion of the clip is adapted to conform to and contact with the convexed portion of the rim, as shown, and double-ended snap-hooks E are provided, the inner ends of which are adapted to engage the apertures D', while their outer hooked ends are designed for engagement with the links of the chain F, which may be of any ordinary construction and of any suitable gage.

In applying my improved antislipping device to a vehicle-wheel the clips D are fastened to the rim at intervals by passing the bolts C through the apertures in the latter, and thus causing the clips to be securely clamped to the rim, after which the snap-hooks are caught in the outwardly-turned ends of the clips and the chain caught alternately, first upon a snap-hook upon one side of the rim and then upon the other side, affording means for holding the chain in a zigzag manner over the tread of the tire in the manner disclosed by the drawings.

By the provision of an apparatus as shown and described it will be observed that a simple mechanism is afforded, which may be easily applied to or detached from a tire, as may be desired.

While I have shown a particular form of antislipping device illustrating my idea, it will be understood that I may vary the details of the same, if desired, without in any way departing from the spirit of the invention.

Having thus fully described my invention, what I claim as new, and desire to secure by Letters Patent, is—

1. An antislipping device for tires comprising, in combination with a vehicle-rim, clips engaging said rim, snap-hooks detachably held to the ends of said clips upon opposite sides of the rim, a chain having a zigzag course in contact with the tread of the tire and engaging said snap-hooks alternately upon opposite sides of the rim, as set forth.

2. An antislipping device for tires of wheels, comprising, in combination with the rim of a wheel, clips clamped to the rim and having apertures in their ends, double-ended snap-hooks, the inner ends of each engaging an aperture in one of said clips, a chain arranged in a zigzag relation over the tread of the tire and engaging alternately the outer ends of said snap-hooks upon opposite sides of the rim, as set forth.

3. An antislipping device for the tires of vehicle-wheels comprising, in combination with the rim, having apertures therein, clips engaging the rim, bolts passing through registering apertures in said clips and rim, whereby the clips may be securely held to the rim, snap-hooks engaging the apertures in the ends of said clips, and a chain arranged in a zigzag manner over the tread of the tire and engaging alternately snap-hooks upon opposite sides of said rim, as set forth.

4. An antislipping device for tires, comprising, in combination with the rim of a wheel, having apertures spaced apart, clips conforming to the convexed outline of the rim and having their ends outwardly curved and apertured, bolts passing through the apertures of the rim and engaging said clips, double-ended snap-hooks engaging the apertures in the outwardly-curved ends of said clips, and a chain arranged in a zigzag manner in contact with the tread of the tire and engaging alternately snap-hooks upon opposite sides of the rim, as set forth.

In testimony whereof I hereunto affix my signature in the presence of two witnesses.

WILLIAM J. SMITH.

Witnesses:
FRED U. FISH,
FRED. H. KNIGHT.